United States Patent Office 3,100,751
Patented Aug. 13, 1963

3,100,751
POLYMERS FROM CONDENSATIONS OF FORMALDEHYDE WITH SULFAMIDES
Herbert Q. Smith, Trenton, N.J., and Francis L. Scott, Elkins Park, Pa., assignors to Pennsalt Chemicals Corporation, Philadelphia, Pa., a corporation of Pennsylvania
No Drawing. Filed Feb. 10, 1960, Ser. No. 7,750
19 Claims. (Cl. 260—2.2)

The invention deals with novel polymers and in particular relates to polymers derived from imidodisulfamides and formaldehyde. This invention also relates to such polymers modified with a 1,3,5-triazine compound and to the use of these imidodisulfamide-derived polymers as novel ion-exchange resins.

The preferred imidodisulfamide-formaldehyde polymers of this invention are obtained readily by reacting formaldehyde with an imidosulfamide having the chemical structure

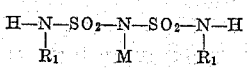

where the $R_1$ radicals are the same or different and are selected from the group of hydrogen, lower primary alkyl and lower secondary alkyl radicals, said alkyl radicals containing from one to four carbon atoms, and M is an atom of hydrogen or an alkali metal. Thus, the imidodisulfamides which are preferred will include the parent imidodisulfamide itself (i.e., $H_2N$—$SO_2$—$NH$—$SO_2$—$NH_2$) as well as 1-methyl-imidodisulfamide, 1,3-diethyl-imidodisulfamide, 1-ethyl-3-n-propyl-imidodisulfamide, 1,3-dibutyl-imidodisulfamide, 1-methyl-3-isopropyl-imidodisulfamide, the alkali metal salts (e.g., Na, K, etc.) of these compounds, and the like. It will be understood that the $R_1$ radicals are not limited to four carbon atoms and may contain up to eighteen carbon atoms if desired.

The imidodisulfamides of this class are readily prepared by the action of an alkali metal hydroxide upon the appropriate sulfamide (i.e., a sulfamide of structure

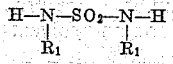

where $R_1$ is the same as above). The preparation of imidodisulfamides by such a method is known and is reported by A. V. Kirsanov and Y. M. Zolotov, Zhur. Obshchei Khim. 20, 1650, 1790 (1950), and by M. Goehring et al. in Z. Anorg. Chem. 273, 205 (1953).

The reaction between the formaldehyde and the imidodisulfamide is carried out quite readily. The imidodisulfamide, preferably as an alkali metal salt, such as the potassium or sodium salt, is mixed with aqueous formaldehyde solution and refluxed for about one to about three hours. The reaction occurs under either acid or basic conditions, but proceeds best under neutral or alkaline conditions, preferably at a pH of 7.0 to about 11. When the reaction is completed the reaction mass is cooled and the polymer separates out. It is then filtered off, washed, and purified, if desired, by recrystallization from a water-ethanol mixture. It will be understood that stoichiometric amounts of the imidodisulfamide and formaldehyde react. In the case of imidodisulfamide itself, two moles of formaldehyde can react with each —$NH_2$ group of the imidodisulfamide. Where the —$NH_2$ group bears an $R_1$ substituent, of course, only one mole of formaldehyde can react with the

group. In any event, aqueous formaldehyde is preferably used and a molar excess (usually a two to six molar excess) of the formaldehyde is used. This, of course, leads to methylol end groups in the polymer, which polymer can be represented by the following structural unit:

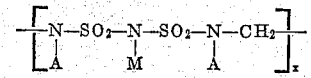

where A is H, lower primary alkyl, lower secondary alkyl or methylol (—$CH_2OH$) groups and M is as defined above.

As indicated, the imidodisulfamide-formaldehyde polymers may be modified with 1,3,5-triazines. These triazines will preferably have the structure

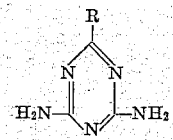

where R is selected from the group of lower alkyl, aryl, and

radicals, R' and R" being hydrogen or lower alkyl radicals. Thus, when R is a lower alkyl radical such as methyl, ethyl, n-propyl, isopropyl, n-butyl, t-butyl and the like, the triazine will be a 2,4-diamino-6-alkyl-1,3,5-triazine. These compounds are described and reference to their preparation given in Table IV–B, page 244 of the monograph entitled "s-Triazines and Derivatives," by E. M. Smolin and L. Rapoport, Interscience Publishers, Inc., New York, 1959. Likewise, Table IV-B-1 on page 246 of the same monograph describes those triazines where R is aryl; i.e., phenyl, m-tolyl, α-naphthyl, β-naphthyl and the like. It will be understood that where R is phenyl, the 1,3,5-triazine is commonly referred to as benzoguanamine. Where the R radical is

and R' and R" are both hydrogen, the triazine is melamine. Where R' and R" are the same or different lower alkyl groups, the 1,3,5-triazines useful to give the polymers of this invention are N-substituted melamines such as methylmelamine, ethylmelamine, N-isobutylmelamine, N,N-diethylmelamine, N,N-dibutylmelamine, and the like. These N-substituted melamines are disclosed and their preparation given on pages 360 to 364 of the above monograph.

The reaction process to obtain the modified imidodisulfamide polymers is carried out in a manner similar to the process already described without the modifier. The 1,3,5-triazine is simply added to the aqueous reaction mixture and the mass refluxed for several hours. An alternate procedure which may be employed when using the modifying triazines is to first prepare a methylol-triazine by reaction of the triazine with formaldehyde and then add the imidodisulfamide.

The amounts of imidodisulfamide, triazine and formaldehyde reactants that may be used may vary considerably. It is found that these novel polymers are obtained when the proportion of triazine in the polymer is either high or low. That is, these polymers can have a high or low imidodisulfamide to triazine molar ratio. Usually this molar ratio will be on the order of 1:1, but polymers may be obtained with molar ratios of 1:10 and 10:1. The amount of formaldehyde employed will preferably be four moles per one mole or triazine, but more or less can, of course, be used and the amounts usually taken will vary from one to twenty-five moles per mole of triazine. The above-mentioned 1:1 polymer has an ion exchange capacity of about 1.5 to 2.0 milliequivalents per gram, but a higher exchange capacity is obtained with a greater imidodisulfamide content.

The novel polymers of this invention are white solids and have physical properties which vary with the particular modifying triazine used. In the absence of a 1,3,5-triazine the imidodisulfamide-formaldehyde polymer is a high melting solid (M.P. 256°–263° C.) which is soluble in hot water, insoluble in cold water and insoluble in organic solvents. When modified with melamine the polymer is also rather high melting and is insoluble in water and in organic solvents. With benzoguanamine as the modifier, the polymers obtained have water solubility. In any event, all of these polymers are useful as ion exchange resins either in aqueous or organic systems depending upon the solubility properties of the resin.

The value of these novel polymers as cation exchange resins appears to be due to the acidic imide linkage which occurs throughout the polymer chain. This imide group may be present in the polymer in the salt form (i.e., ionically bonded to a metal cation) or acid form (i.e., bonded to a proton) and may be converted from one to the other by ion exchange techniques known in the art. In using these techniques, the novel resins of this invention in their acid form will exchange with all metal ions, and these resins are particularly effective with alkali metal, alkaline earth metal and transition metal ions. The metal salt form of the resin is readily regenerated to the acid form by treatment with an aqueous protonic acid solution in accord with known ion exchange techniques. In using the resins, either batch or column methods may be used and in the column technique either fixed or moving bed systems may be employed.

EXAMPLE 1

*Potassium Imidodisulfamide-Formaldehyde Reaction Product*

A mixture of 2.0 g. (9.4 mmol) of potassium imidodisulfamide, 3.4 g. (41.7 mmol) of 37% formaldehyde, 0.80 ml. (0.40 mmol) of 0.5 N potassium hydroxide solution, and 0.09 g. (1.5 mmol) of 29% aqueous ammonia is refluxed for one hour. The product is 0.6 g. of white solid, soluble in hot water, but not in organic solvents.

*Analysis.*—C, 14.58; H, 3.06; N, 18.46; S, 25.77; K, 13.05.

EXAMPLE 2

*Potassium Immidodisulfamide-Formaldehyde-Melamine Reaction Product*

The reaction is run as in Example 1 with 1.2 g. (9.4 mmol) of melamine added. The product is 0.9 g. of white solid, M.P. 265°–270° C. (dec.), insoluble in water and organic solvents.

*Analysis.*—Found: C, 22.90; H, 3.82; N, 34.78; S, 14.16; K, 9.06. Calcd. for $C_9H_{18}KN_{12}O_5S_2$: C, 22.62; N, 3.81; N, 35.25; S, 13.44; K, 8.19.

EXAMPLE 3

*Potassium Imidodisulfamide-Formaldehyde-Benzoquanamine Reaction Product*

The reaction is run as in Example 1 with 1.8 g. (9.4 mmol) of benzoguanamine added. After one-hour refluxing and cooling, a clear solution is obtained. Addition of 20 ml. of ethanol gives a precipitate which is filtered off, washed with ethanol, and dried. The white solid, 2.9 g., M.P. 135° C. (dec.) is soluble in water and insoluble in organic solvents.

*Analysis.*—Product leached with ethanol and dioxane prior to analysis. Found: C, 29.05; H, 3.97; N, 22.35; S, 15.34; K, 9.78. Calcd. for $C_{10}H_{16}KN_6O_5S_2$: C, 29.37; H, 4.01; N, 20.82; S, 15.90; K, 9.69.

EXAMPLE 4

The reaction is run as in Example 3 with 9.4 mmol of acetoguanamine in place of benzoguanamine. The product is a white solid which is soluble in water and insoluble in organic solvents.

EXAMPLE 5

The reaction is run as in Example 2 with 9.4 mmol of N-ethylmelamine in place of melamine. The product is a white solid which is insoluble in water and common organic solvents.

EXAMPLE 6

*Use of Melamine-Potassium Imidodisulfamide-Formaldehyde Polymer as Cation Exchange Resin*

(a) CONVERSION OF THE SALT FORM TO ACID FORM $$(K^+ \text{ resin}^-) + H^+ + Cl^- \rightarrow (H^+ \text{ resin}^-) + K^+ + Cl^-$$

A mixture of 0.55 g. of finely powdered melamine-potassium imidodisulfamide-formaldehyde polymer and 10 ml. of 0.096 N HCl (0.96 mmol) is agitated for 25 min. Titration of an aliquot of the supernatant liquid with standard NaOH shows that 0.90 mmol of acid is consumed. The white solid is filtered off, washed with water, and dried at 60° C.; weight of solid is 0.41 gram.

(b) CONVERSION OF ACID TO SALT FORM $$(H^+ \text{ resin}^-) + Na^+ + OH^- \rightarrow (Na^+ \text{ resin}^-) + H_2O$$

A mixture of 0.41 gram of the above acid form and 15 ml. of 0.104 N NaOH (1.56 mmols) is agitated for 25 min. Titration of an aliquot of the supernatant liquid with standard HCl shows that 0.83 mmol of NaOH is consumed. The white solid is isolated as above to give 0.37 gram.

EXAMPLE 7

Exchange reactions are conducted as in Example 6 except the cation exchange resin is the N-ethylmelamine-potassium imidodisulfamide-formaldehyde polymer of Example 5. In this way the acid form and the sodium form, respectively, of this resin are prepared.

EXAMPLE 8

Example 2 is repeated using the potassium salt of 1,5-dimethylimidodisulfamide. The product is a white solid insoluble in water and organic solvents.

EXAMPLE 9

The acid form of the melamine-potassium imidodisulfamide-formaldehyde resin is prepared as in Example 6. This acid form is then treated with a 0.1 N aqueous solution of magnesium sulfate with agitation. Titration of an aliquot of the supernatant liquid with standard NaOH solution shows that a nearly theoretical amount of acid is liberated.

EXAMPLE 10

The reaction is run as Example 9 except that 0.1 N aqueous ferric nitrate solution is used in place of $MgSO_4$ solution. Titration of an aliquot of the supernatant liquid in the same way shows that a nearly theoretical amount of acid is liberated.

In like manner, the ion exchange capacity of the resin is shown with nickel sulfate, calcium nitrate, cobalt chloride and barium nitrate.

In addition to their use as ion exchange resins, many of these novel polymers have additional utility. For example, the melamine modified imidodisulfamide-formaldehyde polymer may be molded under the influence of heat and pressure (100° to 200° C. and up to 10,000 lbs. per square inch) to give useful articles. The benzoguanamine modified imidodisulfamide-formaldehyde polymer may be used in aqueous solutions as a coating resin or as an impregnant for wood, textiles, and paper and the like.

It will be apparent to the skilled art worker that numerous variations may be made in the practice of this

We claim:
1. A polymer obtained by refluxing at a pH between about pH 7 and pH 11 an aqueous solution comprising at least a stoichiometric amount of formaldehyde with an imidodisulfamide having the structure

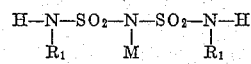

where $R_1$ is a radical selected from the group of (a) hydrogen and (b) primary and secondary alkyl radicals containing from one to eighteen carbon atoms and M is selected from the group consisting of hydrogen and an alkali metal.

2. A process for preparing polymers which comprises refluxing at a pH between about pH 7 and pH 11 an aqueous solution comprising at least a stoichiometric amount of formaldehyde with an imidodisulfamide having the structure

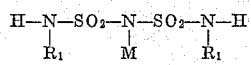

where $R_1$ is a radical selected from the group of (a) hydrogen and (b) primary and secondary alkyl radicals containing from 1 to 18 carbon atoms and M is selected from the group consisting of hydrogen and an alkali metal.

3. A novel polymer which is the reaction product obtained by refluxing an aqueous solution at a pH between about pH 7 and pH 11 consisting of formaldehyde, an imidodisulfamide having the structure

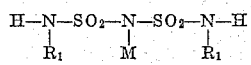

where $R_1$ is a radical selected from the group of hydrogen, lower primary alkyl, and lower secondary alkyl radicals and M is selected from the group consisting of hydrogen and alkali metal, and a 1,3,5-triazine having the structure

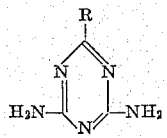

where R is selected from the group of lower alkyl, aryl, and

radicals, R' and R'' are selected from the group of hydrogen and lower alkyl radicals, the ratio of said triazine to said imidodisulfamide being between about 1:10 and 10:1, and the amount of formaldehyde taken being between 2 and 25 moles per mole of triazine.

4. A novel polymer as in claim 3 chemically modified by reaction with a 1,3,5-triazine of the structure

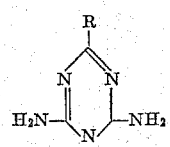

from the group of lower alkyl, aryl, and

radicals, R' and R'' are selected from the group of hydrogen and lower alkyl radicals.

5. A polymer as in claim 3 of formaldehyde, imidodisulfamide and a member selected from the group consisting of melamine and an N-lower alkyl substituted melamine.

6. A polymer as in claim 1 which is the reaction product of formaldehyde and imidodisulfamide.

7. A polymer as in claim 3 of formaldehyde, imidodisulfamide and melamine.

8. A polymer as in claim 3 of formaldehyde, imidodisulfamide and benzoguanamine.

9. A polymer as in claim 3 of formaldehyde, imidodisulfamide, and acetoguanamine.

10. A polymer as in claim 3 of formaldehyde, 1,5-dimethylimidodisulfamide and melamine.

11. A polymer of claim 3 where the triazine is N-ethylmelamine.

12. The process of making novel polymers which comprises refluxing in aqueous solution and at a pH between about 7.0 and about 11, a mixture of formaldehyde, an imidodisulfamide of structure

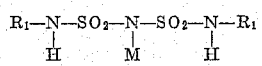

where $R_1$ is a member selected from the group of hydrogen, lower primary alkyl and lower secondary alkyl radicals and M is an alkali metal, and a 1,3,5-triazine of structure

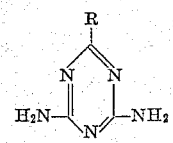

wherein R is selected from the group of lower alkyl, aryl, and

radicals, R' and R'' are selected from the group of hydrogen and lower alkyl radicals, the amount of formaldehyde taken being between 2 and 25 moles per mole of triazine.

13. The process of removing metal ions from solution which comprises contacting said solution with the polymer of claim 1.

14. The process of removing metal ions from solution which comprises treating said solution with the polymer of claim 5.

15. An alkaline earth metal salt of the polymer of claim 1.

16. An alkaline earth metal salt of the polymer of claim 4.

17. A transition metal salt of the polymer of claim 1.

18. A transition metal salt of the polymer of claim 4.

19. A novel polymer as in claim 1 modified with a polyamino-1,3,5-triazine.

References Cited in the file of this patent
UNITED STATES PATENTS 2,366,494  D'Alelio _____ Jan. 2, 1945
2,369,503  Walker _____ Feb. 13, 1945

OTHER REFERENCES

Wood et al.: Journal of the Society of Chemical Industry, October 20, 1933, pages 346T–349T.

Kirsanov et al.: Chem. Abstracts, vol. 45, columns 1950–1951 (1948).